United States Patent

Hansen et al.

[11] 4,083,684
[45] Apr. 11, 1978

[54] UNIFORMLY DYED WATER-SWELLABLE CELLULOSIC FIBERS

[75] Inventors: Guenter Hansen, Ludwigshafen; Hermann Kaack, Wachenheim; Wolf-Dieter Kermer, Fussgoenheim; Guenter Meyer, Ludwigshafen, all of Germany

[73] Assignee: BASF Aktiengesellschaft, Ludwigshafen am Rhein, Germany

[21] Appl. No.: 770,095

[22] Filed: Feb. 18, 1977

[30] Foreign Application Priority Data

Mar. 1, 1976 Germany .................... 2608345

[51] Int. Cl.² ................ C09B 27/00; D06P 1/02
[52] U.S. Cl. .................................. 8/41 R; 8/21 C; 8/54.2; 8/62; 8/93; 8/169; 8/179
[58] Field of Search .......... 8/41 R, 54.2, 93, 21 C

[56] References Cited

U.S. PATENT DOCUMENTS

| | | | |
|---|---|---|---|
| 3,706,525 | 12/1972 | Blackwell et al. | 8/21 C |
| 3,707,348 | 12/1972 | Blackwell et al. | 8/21 C |
| 3,888,624 | 6/1975 | Blackwell et al. | 8/21 C |
| 4,049,377 | 9/1977 | Schwab | 8/169 |

*Primary Examiner*—A. Lionel Clingman
*Attorney, Agent, or Firm*—Keil, Thompson & Shurtleff

[57] ABSTRACT

Uniformly dyed water-swellable cellulosic fibers obtained by dyeing cellulosic fibers in the swollen state with a dye of the formula

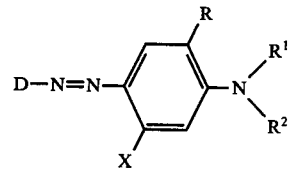

in which D is the radical of a diazo component;

$R^1$ and $R^2$ are optionally substituted alkyl and one of them may also be cyclohexyl, phenyl, methoxyphenyl or ethoxyphenyl and X is hydrogen, chloro, methyl or acylamino, the molecule containing in the radicals $R^1$, $R^2$ and X at least one group: $-CO-R^3-Y-Ar$ where $R^3$ is $C_1$ to $C_3$ alkylene;

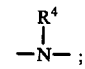

Y is oxygen, sulfur or $R^4$ is hydrogen or $C_1$ to $C_4$ alkyl; and

Ar is phenyl or phenyl bearing chloro, bromo, methyl, methoxy, ethoxy, $C_1$ to $C_4$ alkoxycarbonyl or cyano as a substituent.

18 Claims, No Drawings

UNIFORMLY DYED WATER-SWELLABLE CELLULOSIC FIBERS

The invention relates to uniformly dyed water-swellable cellulosic fibers which are fast to washing, drycleaning, sublimation and light and have been produced by contacting water-swellable cellulose fibers sequentially or concomitantly with water, ethylene glycol or a derivative thereof and, while the fibers are still swollen, an essentially water-insoluble dye of the formula

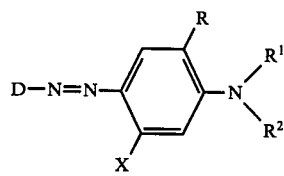

in which

D is the radical of a diazo component;

$R^1$ and $R^2$ are optionally substituted alkyl and one of them may also be cyclohexyl, phenyl, methoxyphenyl or ethoxyphenyl and X is hydrogen, chloro, methyl or acylamino, the molecule containing in the radicals $R^1$, $R^2$ and X at least one group: —CO—$R^3$—Y—Ar where $R^3$ is $C_1$ to $C_3$ alkylene;

Y is oxygen, sulfur or

Ar is phenyl or phenyl bearing chloro, bromo, methyl, methoxy, ethoxy, $C_1$ to $C_4$ alkoxycarbonyl or cyano as a substituent.

The radicals D are derived particularly from amines of the benzene, naphthalene, benzothiazole, benzoisothiazole, thiazole, thiadiazole, indazole, pyrazole, thiophene, thionaphthene, azobenzene, phthalimide, naphthalimide or anthraquinone series.

Examples of substituents for the radical D of the diazo component are:

In the benzene series: fluoro, chloro, bromo, nitro, cyano, trifluoromethyl, methylsulfonyl, ethylsulfonyl, phenylsulfonyl, carboxylic ester such as $C_1$ to $C_8$ alkoxycarbonyl, phenoxycarbonyl, benzyloxycarbonyl, phenoxyethoxycarbonyl and $C_1$ to $C_8$ β-alkoxyethoxycarbonyl, optionally N-monosubstituted or N,N-disubstituted carbamoyl or sulfamoyl, methyl, ethyl, butyl, octyl, hexyl, methoxy, ethoxy, phenoxy, carboxy, thiazolyl, thiadiazolyl, oxadiazolyl, benzothiazolyl, benzoxazolyl, diphenylphosphinyl and phenylcarbonyl.

N-substituents of carbamoyl or sulfamoyl are for example methyl, ethyl, phenyl, benzyl, phenylethyl, cyclohexyl, norbornyl, propyl, β-hydroxyethyl, γ-hydroxypropyl, β-methoxyethyl, γ-methoxypropyl, γ-ethoxypropyl and also pyrrolidide, piperidide and morpholide.

In the azobenzene series: fluoro, chloro, bromo, nitro, cyano, trifluoromethyl, methyl, ethyl, carboxy, methoxy and ethoxy and the carboxylic ester, carbamoyl and sulfamoyl radicals specified for the benzene series, hydroxy, acetylamino, propionylamino and benzoylamino.

In the heterocyclic series: chloro, bromo, nitro, cyano, thiocyanato, methyl, ethyl, β-cyanoethyl, phenyl, methoxy, ethoxy, methylmercapto, β-carbomethoxyethylmercapto, β-carboethoxyethylmercapto, β-cyanoethylmercapto, carbomethoxy, carboethoxy, acetyl, methylsulfonyl and ethylsulfonyl.

In the anthraquinone series: chloro, bromo, amino, acetyl, methyl, ethyl, phenylamino, tolylamino, hydroxy, methoxy, ethoxy, cyano and carboxy.

In the benzene and naphthalene series those diazo components are preferred which have at least one substituent which lowers the basicity such as nitro, methylsulfonyl, phenylsulfonyl, ethylsulfonyl, carboxylic ester, optionally N-substituted carbamoyl, chloro, bromo, trifluoromethyl, cyano, thiazolyl, thiadiazolyl, oxadiazolyl, benzothiazolyl and benzoxazolyl. Examples of optionally substituted alkyl $R^1$ and $R^2$ are: allyl, alkyl of one to four carbon atoms, alkyl of two to four carbon atoms bearing chloro, hydroxy, cyano, acetylamino, benzoylamino, alkoxy of one to four carbon atoms, alkoxycarbonyl of one to four carbon atoms, alkanoyloxy of one to four carbon atoms or benzoyloxy as a substituent, cyclohexyl, benzyl, phenylethyl, phenylhydroxyethyl and phenylpropyl.

Examples of individual radicals $R^1$ and $R^2$ in addition to those already specified are: methyl, ethyl, propyl, butyl, β-hydroxyethyl, β-hydroxypropyl, β-hydroxybutyl, β-chloroethyl, β-cyanoethyl, β-acetylaminoethyl, β-acetylaminopropyl, β-benzoylaminoethyl, β-benzoylaminopropyl, β-methoxyethyl, β-ethoxyethyl, β-butoxyethyl, β-carbomethoxyethyl, β-carboethoxyethyl, β-acetoxyethyl, β-propionyloxyethyl, β-butyroxyethyl and β-valeroyloxyethyl.

Examples of acylamino radicals X are acetylamino, propionylamino, butyrylamino, chloroacetylamino, dichloroacetylamino, trifluoroacetylamino, benzoylamino and HN—OC—$R^3$—Y—Ar and also methylsulfonylamino, ethylsulfonylamino and phenylsulfonylamino.

The group OC—$R^3$—Y—Ar may also be present in the form of an acyloxy or acylamino group in the radicals $R^1$ and/or $R^2$.

Examples of radicals $R^4$ are propyl, butyl and particularly methyl and ethyl.

Examples of alkoxycarbonyl radicals for Ar are methoxycarbonyl, ethoxycarbonyl, propoxycarbonyl and butoxycarbonyl.

Dyes of the formula (I) may be prepared by reacting a diazo compound of an amine of the formula (II):

$$D—NH_2 \qquad (II)$$

with a coupling component of the formula (III):

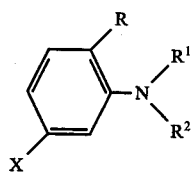

where D, R, X, $R^1$ and $R^2$ have the meanings given above.

The diazotization of the amines may be carried out by a conventional method. The coupling is also carried out as usual in an aqueous medium with or without the addition of solvents at a strongly to weakly acid reaction.

The invention relates in particular to fibers which have been dyed with dyes of the formula

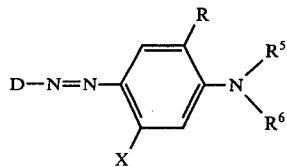

in which D is phenyl subsituted by fluoro, chloro, bromo, nitro, cyano, trifluoromethyl, methylsulfonyl, ethylsulfonyl, phenylsulfonyl, $C_1$ to $C_8$ alkoxycarbonyl, phenoxycarbonyl, benzyloxycarbonyl, phenoxyethoxycarbonyl, $C_1$ to $C_4$ alkoxyethoxycarbonyl, methyl, ethyl, methoxy, ethoxy, phenoxy, carboxy, phenylazo, phenylazo bearing fluoro, chloro, bromo, nitro, cyano, trifluoromethyl, methyl, ethyl, methoxy, ethoxy,

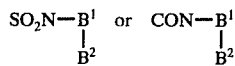

as a substituent,

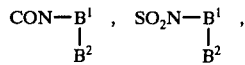

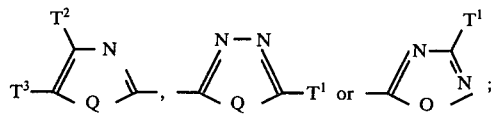

benzothiazolyl bearing nitro, thiocyanato, methylsulfonyl or methoxy as a substituent; benzoisothiazolyl bearing chloro, bromo, nitro or cyano as a substituent; thiazolyl bearing phenyl or nitro as a substituent or thiadiazolyl bearing phenyl, methylmercapto, ethylmercapto, cyanoethylmercapto or $C_1$ to $C_4$ alkoxycarbonylethylmercapto as a substituent;
Q is O or S;
R is hydrogen, methyl, methoxy or ethoxy;
X is hydrogen, chloro, methyl, $C_2$ to $C_4$ alkanoylamino, chloroacetylamino, trifluoroacetylamino, benzoylamino, methylsulfonylamino, phenylsulfonylamino or $NHCOR^3$—O—Ar;
$R^5$ is $C_1$ to $C_4$ alkyl, allyl, $\beta$-hydroxyethyl, $\beta$-cyanoethyl, $\beta$-acetoxyethyl, $\beta$-methoxyethyl, $\beta$-ethoxyethyl, cyclohexyl, benzyl, $\beta$-phenylethyl or $C_2H_4OCOR^3$—OAr;
$R^6$ is $C_1$ to $C_4$ alkyl, allyl, acetoxyethyl, $\beta$-cyanoethyl, benzyl or $C_2H_4OCOR^3OAr$;
$B^1$ is hydrogen, $C_1$ to $C_8$ alkyl, cyclohexyl, $\beta$-hydroxyethyl, benzyl, phenylethyl or phenyl optionally bearing chloro, methyl or methoxy as a substituent;
$B^2$ is hydrogen, $C_1$ to $C_4$ alkyl or $\beta$-hydroxyethyl;

is pyrrolidyl, piperidyl, morpholyl or $NH(CH_2)_3OC_2H_4OB^3$;
$B^3$ is $C_1$ to $C_2$ alkyl, cyclohexyl, phenyl or tolyl;
$T^1$ is $C_1$ to $C_8$ alkyl, methoxymethyl, phenoxymethyl, phenyl or phenyl bearing chloro, bromo, nitro, methoxy or ethoxy as a substituent;

$T^2$ is hydrogen or methyl;
$T^3$ is methyl, ethyl, phenyl or phenyl bearing chloro, bromo, or methyl as a substituent;
$T^2$ and $T^3$ together are a fused benzene ring optionally bearing methoxy, ethoxy, methyl or chloro as a substituent;
$R^3$ is $C_1$ to $C_3$ alkylene; and
Ar is phenyl or phenyl bearing chloro, bromo, methyl or methoxy as a substituent and at least one of the radicals $R^5$, $R^6$ or X contains a group of the formula $OCOR^3$—OAr.

Dyes and dye mixture which are particularly valuable for dyeing the fibers of the invention are those of the formula (Ia):

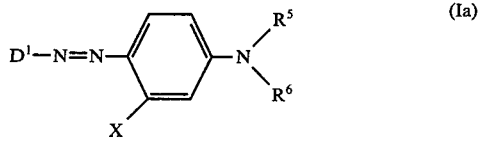

in which $D^1$ is the radical of a diazo component of the benzene, thiadiazole, benzoisothiazole, phthalimide, naphthalimide, anthraquinone or azobenzene series;
$R^5$ is $C_1$ to $C_4$ alkyl, allyl, $\beta$-hydroxyethyl, $\beta$-cyanoethyl, $\beta$-acetoxyethyl, $\beta$-methoxyethyl, $\beta$-ethoxyethyl, cyclohexyl, benzyl, $\beta$-phenylethyl or $—C_2H_4OCOR^3—Y—Ar$;
$R^6$ is $C_1$ to $C_4$ alkyl, $\beta$-acetoxyethyl, $\beta$-cyanoethyl, benzyl or $—C_2H_4OCOR^3—Y—Ar$; and X, $R^3$, Y and Ar have the meanings given above.

The radical $D^1$ may be derived in particular for example from the following amines: o-nitroaniline, m-nitroaniline, p-nitroaniline, o-cyanoaniline, m-cyanoaniline, p-cyanoaniline, 2,4-dicyanoaniline, o-chloroaniline, m-chloroaniline, p-chloroaniline, 2,4-dichloroaniline, 3,4-dichloroaniline, 2,5-dichloroaniline, 2,4,5-trichloroaniline, 2,4,6-trichloroaniline, o-bromoaniline, m-bromoaniline, p-bromoaniline, 2,4,6-tribromoaniline, 2-chloro-4-nitroaniline, 2-bromo-4-nitroaniline, 2-cyano-4-nitroaniline, 2-methylsulfonyl-4-nitroaniline, 2-methoxy-4-nitroaniline, 4-chloro-2-nitroaniline, 2,4-dicyano-6-chloroaniline, 2-cyano-4,6-dibromoaniline, 2,4-dicyano-6-bromoaniline, 4-cyano-2-chloroaniline, 1-amino-2-trifluoromethyl-4-chlorobenzene, 2-chloro-5-aminobenzonitrile, 2-amino-5-chlorobenzonitrile, 1-aminobenzene-4-methylsulfone, 1-amino-2,6-dibromobenzene-4-methylsulfone, 1-amino-2-chloro-4-methylsulfone, 1-amino-2,6-dichlorobenzene-4-methylsulfone, 2,4-dinitroaniline, 2,4-dinitro-6-chloroaniline, 2,4-dinitro-6-bromoaniline, 2,4-dinitro-6-cyanoaniline, 1-amino-2,4-dinitrobenzene-6-methylsulfone, 2,6-dichloro-4-nitroaniline, 2,6-dibromo-4-nitroaniline, 2-chloro-6-bromo-4-nitroaniline, 2,6-dicyano-4-nitroaniline, 2-cyano-4-nitro-6-chloroaniline, 2-cyano-4-nitro-6-bromoaniline, the methyl or $\beta$-methoxyethyl ester of 1-amino-2,4-dinitrobenzene-6-carboxylic acid, the methyl, ethyl, propyl, butyl, isobutyl, $\beta$-ethylhexyl, cyclohexyl, benzyl, phenyl, $\beta$-methoxyethyl, $\beta$-ethoxyethyl, $\beta$-butoxyethyl, methyldiglycol, ethyldiglycol, methyltriglycol, ethyltriglycol or $\beta$-acetoxyethyl ester of 2-aminobenzoic acid, 3-aminobenzoic acid or 4-aminobenzoic acid, the methyl, isobutyl, methyldiglycol, $\beta$-methoxyethyl, $\beta$-butoxyethyl or $\beta$-acetoxyethyl ester of 5-nitroanthranilic acid, the propyl ester of 3,5-dichloroanthranilic acid, the $\beta$-methoxyethyl ester of 3,5-dibromoanthranilic, 4-diphenylphosphinylaniline, the dimethyl, diethyl, dipropyl or dibutyl ester of 3-aminophthalic acid, 4-aminophthalic acid, 5-aminoisophthalic acid or aminoterephthalic acid, the amide, methylamide, propylamide, butylamide, isobutylamide, cyclohexylamide, β-ethylhexylamide, γ-methoxypropylamide, γ-ethoxypropylamide, or anilide of 3-aminobenzoic or 4-aminobenzoic acid, the dimethylamide, diethylamide, pyrrolidide or morpholide of 2-aminobenzoic, 3-aminobenzoic or 2-aminobenzoic acid, the diamide or bis-γ-methoxypropylamide of 5-aminoisophthalic acid, the dimethylamide, diethylamide, pyrrolidide, morpholide or N-methylanilide of 2-aminobenzenesulfonic, 3-aminobenzenesulfonic or 4-aminobenezenesulfonic acid, 4-aminoacetophenone, 4-aminobenzophenone, 2-aminobenzophenone, 2-aminodiphenylsulfone, 4-aminodiphenylsulfone, the β-hydroxyethylimide, 3'-methoxypropylimide, phenylimide or p-tolylimide of 3-aminophthalic or 4-aminophthalic acid, 3-amino-6-chlorophthalimide and its N-substitution products, 3-amino-4-cyano-5-methylphthalimide or 3-amino-4-cyano-5-ethylphthalimide and their N-substitution products, 1-amino-2-chloroanthraquinone, 1-amino-2-bromoanthraquinone, 1-amino-2,4-dibromoanthraquinone, 1-amino-2-acetyl-4-chloroanthraquinone, 1-aminoanthraquinone-6-carboxylic acid, 1-aminoanthraquinone-6-carboxylic acid ethyl ester, 1-amino-4-methoxyanthraquinone, 1-amino-4-hydroxyanthraquinone, 1-amino-2-chloro-4-p-toluidinoanthraquinone, 2-amino-1-chloroanthraquinone, 2-amino-3-chloroanthraquinone, 2-amino-3-bromoanthraquinone, 2-amino-1,3-dibromoanthraquinone, 2-amino-1-cyano-3-bromoanthraquinone, 1-aminobenzanthrone, 6-aminobenzanthrone, 7-aminobenzanthrone, 1-aminoanthraquinone, 2-aminoanthraquinone, 1-amino-4-chloroanthraquinone, 2,4-dicyano-3,5-dimethylaniline, the imide, methylimide, n-butylimide, 2'-hydroxyethylimide, 3'-methoxypropylimide, 2'-ethylhexylimide or phenylimide or 4-aminonaphthalic acid, 4-amino-3-bromonaphthalimide and its N-substitution products, 4-amino-7-nitro-1,2-benzoisothiazole, 4-amino-5-cyano-7-nitro-1,2-benzoisothiazole, 4-amino-5-chloro-7-nitro-1,2-benzisothiazole, 4-amino-5-bromo-7-nitro-1,2-benzoisothiazole, 3-amino-5-nitro-2,1-benzoisothiazole, 3-amino-5-nitro-7-bromo-2,1-benzoisothiazole, 3-amino-5-chloro-7-nitro-2,1-benzoisothiazole, 3-amino-2,1-benzoisothiazole, 2-phenyl-5-amino-1,3,4-thiadiazole, 3-methylmercapto-5-amino-1,2,4-thiadiazole, 3-β-carboethoxyethylmercapto-5-amino-1,2,4-thiadiazole, 3-β-carbomethoxyethylmercapto-5-amino-1,2,4-thiadiazole and 3-β-cyanoethylmercapto-5-amino-1,2,4-thiadiazole.

Examples of suitable diazo components of the benzene series having heterocyclic substituents are compounds of the formula:

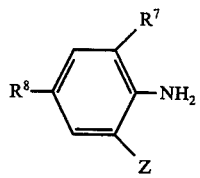

in which
R⁷ is hydrogen, chloro, bromo or cyano;
R⁸ is hydrogen, chloro, bromo or nitro; and
Z is a radical of the formula

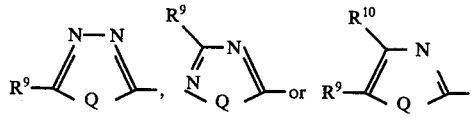

where
Q is oxygen or sulfur;
R⁹ is C₁ to C₈ alkyl or C₁ to C₈ alkoxyalkyl, phenyl, methylphenyl, chlorophenyl, methoxyphenyl or dichlorophenyl;
R¹⁰ is methyl or C₁ to C₄ alkoxycarbonyl; and
R⁹ and R¹⁰ together with the carbon atoms combined therewith are a benzene ring which may bear methoxy, ethoxy, methyl, or chloro as substituents.

Examples of suitable diazo components of the aminoazobenzene series are: 4-aminoazobenzene, 3-chloro-4-aminoazobenzene, 3-bromo-4-aminoazobenzene, 2',3-dimethyl-4-aminoazobenzene, 3',2-dimethyl-4-aminoazobenzene, 2,5-dimethyl-4-aminoazobenzene, 2-methyl-5-methoxy-4-aminoazobenzene, 2-methyl-4',5-dimethoxy-4-aminoazobenzene, 4'-chloro-2-methyl-5-methoxy-4-aminoazobenzene, 4'-chloro-2-methyl-4-aminoazobenzene, 2,5-dimethoxy-4-aminoazobenzene, 4'-chloro-2,5-dimethoxy-4-aminoazobenzene, 4'-chloro-2,5-dimethyl-4-aminoazobenzene, 4'-methoxy-2,5-dimethyl-4-aminoazobenzene, 3,5-dibromo-4-aminoazobenzene, 2,3'-dichloro-4-aminoazobenzene, 3-methoxy-4-aminoazobenzene, 2',3'-dimethyl-5-bromo-4-aminoazobenzene, 4'-amino-2',5'-dimethylazobenzene-4-sulfonic acid amide and 4'-amino-2',5'-dimethylazobenzene-3-sulfonic acid amide and the aminoazobenzenes of the formula:

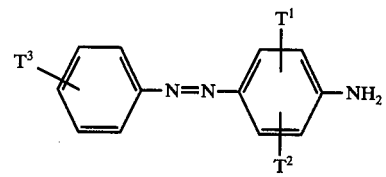

in which
T¹ is hydrogen, chloro, bromo or methyl;
T² is hydrogen or methyl; and
T³ is a radical of the formula

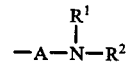

or COOT⁴ in which A is —CO— or —SO₂—;
T⁴ is an alcohol radical; and R¹ and R² have the meanings given above.

Particularly preferred dyes have the formula (Ib):

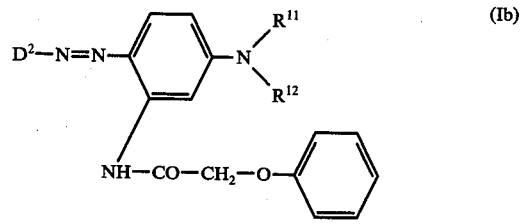

(Ib)

in which $D^2$ is the radical of a diazo component of the benzoisothiazole, thiadiazole, azobenzene or benzene series;

$R^{11}$ is $C_1$ to $C_4$ alkyl, β-cyanoethyl, β-hydroxyethyl, β-acetoxyethyl, β-methoxyethyl, β-ethoxyethyl, cyclohexyl, benzyl or phenylethyl; and $R^{12}$ is $C_1$ to $C_4$ alkyl, β-acetoxyethyl or β-cyanoethyl.

The dyes of the formulae (I), (Ia) and (Ib) in which D, $D^1$ and $D^2$ are derived from amines of the benzoisothiazole series and the heterocyclic substituted benzene series are new.

The dyes of the formula (I) may from their constitution be regarded as substantially insoluble disperse dyes whose application for example to cotton is not possible as a rule. U.S. Pat. No. 3,706,525 discloses however a process which enables them to be printed on cellulose and cellulosic textile material. Statements made therein regarding the process conditions hold good also for dyeing with the dyes of formula I. Other methods are disclosed in U.S. patent application Ser. No. 691,496 according to which the fibers according to this invention may be obtained. Printing processes are preferred. As well as cellulose fibers it is possible to dye and print mixtures of cellulose fibers and synthetic fibers, particularly mixtures of cotton and polyester.

The fibers according to the invention have excellent fastness properties, the wet fastness and in some cases also light fastness being particularly worthy of mention. In the case of prints there is no staining of any white ground, for example during washing.

For dyeing and printing, the dyes of formula (I) are advantageously used in the form of dye formulations which, in addition to the dyes of formula (I), contain dispersants, water retention agents, water and if so desired other conventional constituents in dye formulations, for example disinfectants or antifoam agents.

Suitable dispersants are cation-active compounds, but preferably nonionic and particularly anion-active compounds, i.e., the dispersing agents usually employed for disperse dyes.

Specific examples are lignin sulfonates, sulfomethylation products of phenol, condensation products of phenolsulfonic acids, phenol, formaldehyde and urea, condensation products of β-sulfonaphthalene and formaldehyde and also polyaddition products of propylene oxide and ethylene glycol, propylene glycol or ethylene diamine.

Glycols and glycol ethers such as ethylene glycol, propylene glycol, diethylene glycol or ethylene glycol monomethyl ether are particularly suitable as water retention agents.

In the following Examples, which illustrate the invention, parts and percentages are by weight unless otherwise specified.

EXAMPLE 1

69 parts of 4-amino-5-bromo-7-nitro-1,2-benzoisothiazole is dissolved at 10° to 15° C in 500 parts of 96% sulfuric acid. 150 parts of a mixture of acetic acid and propionic acid in the ratio 17:3 is added at 0° to 5° C and diazotization is carried out by dripping in 75 parts of nitrosylsulfuric acid (11.5% of $N_2O_3$). The whole is stirred for another 3 to 4 hours at 0° to 5° C and the diazo solution is then allowed to flow into a suspension of 125 parts of N,N-bis-(phenoxyacetyloxyethyl)-m-toluidine in 500 parts of acetic acid, 200 parts of concentrated hydrochloric acid, 5 parts of sulfamic acid, 1000 parts of ice and 1000 parts of water. The whole is then diluted with about 2000 parts of ice-water and stirred overnight. The crystalline precipitate is suction filtered, washed with water until neutral and dried at 60° C at subatmospheric pressure. The dye obtained as an olive-black powder is printed as an aqueous dispersion or dissolved in a polyethylene glycol onto polyester cloth, cotton or union fabric of both types of fiber and fixed with hot air or superheated steam. Deeply colored violet prints having good fastness properties are obtained.

Commercial formulations of this and following dyes may be obtained for example as follows:

30 parts of dye,
6 parts of dispersant,
10 parts of water retention agent,
1 part of disinfectant and about
53 parts of water are ground in an agitator mill to a particle size of about 0.5 micron. A dispersion of the dye is thus obtained which is stable in storage.

EXAMPLE 2

55 parts of 2-(2-methyl-1,3,4-oxadiazolyl)-4-nitroaniline is introduced at 0° C to 5° C into a mixture of 500 parts of 85% sulfuric acid and 81 parts of nitrosylsulfuric acid (11.5% of $N_2O_3$). After stirring for 4 hours at 0° to 5° C the diazo solution is poured into a solution of 77 parts of N,N-diethyl-N'-phenoxyacetyl-1,3-phenylenediamine in 500 parts of glacial acetic acid, 5 parts of sulfamic acid, 1000 parts of ice and 1000 parts of water. Coupling is completed by the addition of 400 parts of sodium acetate (crystalline) in 2000 parts of water. The crystalline black-violet product is filtered off, washed with water until free from salt and neutral and dried at subatmospheric pressure at 50° C. The dye dissolves in dimethylformamide and polyethylene glycol with a reddish violet color. When union fabric of polyester and cotton or cloth of the pure fibers is printed with solutions or aqueous dispersions of the dye and then treated with superheated steam or hot air clear reddish violet prints having good fastness properties are obtained.

EXAMPLE 3

73 parts of 4-diphenylphosphinylaniline is dissolved in 800 parts of 85% sulfuric acid at 40° to 50° C. The whole is cooled to 0° to 5° C, diazotized by the addition of 81 parts of nitrosylsulfuric acid (11.5% of $N_2O_3$) and stirred for 3 to 4 hours at 0° to 5° C. After coupling with 77 parts of N,N-diethyl-N'-phenoxyacetyl-1,3-phenylenediamine in the manner described in Example 2 a red powder is obtained which dissolves in dimethylformamide and polyethylene glycol with a reddish orange color. Clear and deep orange hues having very good fastness properties are obtained on cloth of polyester, cotton or blends of the two.

EXAMPLE 4

66.5 parts of 2',3-dichloro-4-aminoazobenzene and 10 parts of an oxyethylated sperm oil alcohol containing about 23 ethylene oxide radicals are stirred overnight with 500 parts of water and 110 parts of 36% hydrochloric acid. 250 parts of ice is added and diazotization is carried out by adding 55 parts by volume of a 23% sodium nitrite solution. After the whole has been stirred for 2 hours at 5° to 10° C the excess nitrous acid is removed with sulfamic acid. The diazo compound is coupled with 77 parts of N,N-diethyl-N'-phenoxyacetyl-1,3-phenylenediamine in the manner described in Example 2. The reddish brown powder obtained which dissolved in dimethylformamide and polyethylene glycol with a reddish violet color gives ruby prints having good fastness properties on polyester, cotton or polyester/cotton union fabric.

The dyes set out in Examples 5 to 10 are prepared in the manner described in Examples 1 to 4.

EXAMPLE 5

Cotton cloth is printed by rotary screen printing with a paste comprising 10 parts of the dye of the formula:

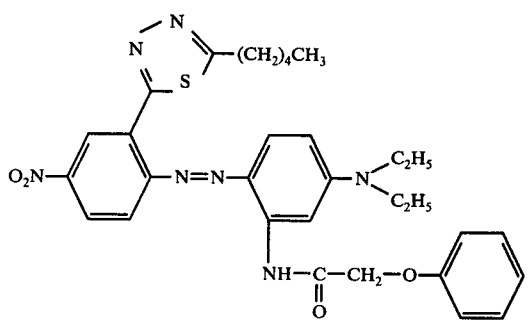

or an appropriate amount of a dye formulation, 100 parts of polyethylene oxide having a molecular weight of 300 and 790 parts of a 3% alginate thickening. The print is dried at 100° C, treated for 1 minute at 200° C with hot air, rinsed cold, soaped at the boil, again rinsed cold and dried. A reddish violet print on a white ground is obtained; it is fast to light and washing.

EXAMPLE 6

Polyester/cotton (67:33) fabric is printed with a paste consisting of 20 parts of the dye of the formula:

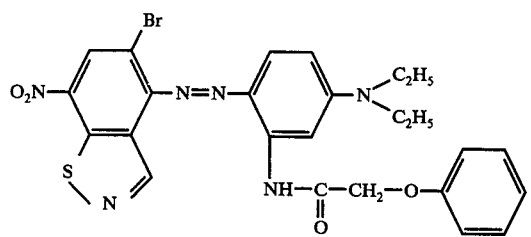

or an appropriate amount of a dye formulation, 120 parts of the reaction product of polyethylene oxide having a molecular weight of 300 with boric acid in a molar ratio of 3:1 and 860 parts of a 10% alginate thickening. The print is dried at 105° C, treated for 6 minutes at 180° C with superheated steam, rinsed with cold water, soaped at 80° C, again rinsed cold and dried.

A light and wash fast navy blue print on a white ground is obtained.

EXAMPLE 7

A cotton cloth is roller printed with a paste consisting of 15 parts of the dye of the formula:

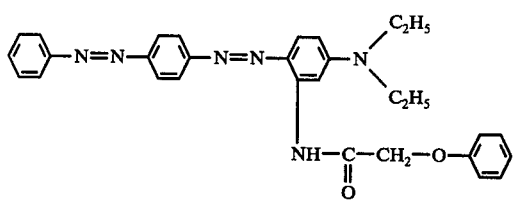

or the appropriate amount of a dye formulation, 110 parts of polyethylene oxide having a molecular weight of 350, 30 parts of the diethanolamide of oleic acid and 845 parts of a 10% alginate thickening. The print is dried at 100° C, fixed by a treatment with hot air for 1 minute at 195° C and finished off as described in Example 5. A fast red print is obtained on a white ground.

EXAMPLE 8

Polyester/cellulose (67:33) fabric is screen printed with a color consisting of 30 parts of the dye of the formula:

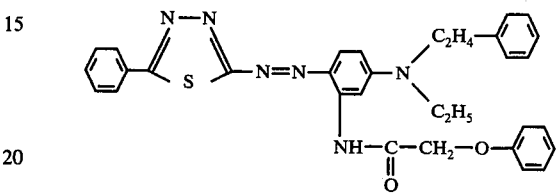

or the appropriate amount of a dye formulation, 100 parts of the reaction product of polyethylene oxide having a molecular weight of 300 with boric acid in a molar ratio of 3:1, 30 parts of the diethanolamide of oleic acid and 840 parts of a 3% alginate thickening. The print is dried at 110° C, treated for 5 minutes at 185° C with superheated steam and finished off as described in Example 6. A fast reddish violet print on a white ground is obtained.

EXAMPLE 9

Cotton cloth is padded with a solution containing 20 parts of the dye of the formula:

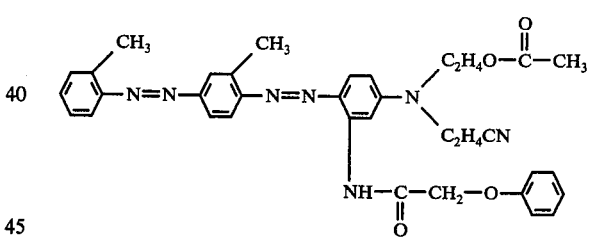

or the appropriate amount of a dye formulation, 300 parts of a 3% alginate thickening, 550 parts of water and 130 parts of polyethylene oxide of the molecular weight 300. The liquor take-up should be 80%. The cloth is dried at 100° C. It is then treated fo 5 minutes with superheated steam at 190° C to fix the dye, rinsed cold and washed at 90° C in a liquor which contains 3 parts of the condensation product of a long-chain alcohol with ethylene oxide and 997 parts of water. A red dyeing is obtained.

Instead of cotton cloth a union fabric of polyester and cotton (67:33 by weight) may be padded with the solution described. A red dyeing is obtained in which the two phases are equal in shade. Fixation with hot air at 195° C for 2 minutes may be used instead of treatment with superheated steam.

EXAMPLE 10

Cotton cloth is padded with a solution of 150 parts of polyethylene oxide in 850 parts of water so that the liquor take-up is 80% and the padded cloth is dried at 100° C. The cloth pretreated in this way is printed by rotary screen printing with a paste consisting of 30 parts of the dye of the formula

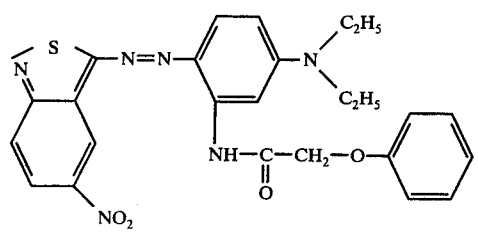

or a appropriate amount of a dye formulation, and 970 parts of a 10% alignate thickening. After the print has been dried at 105° C it is treated for 7 minutes at 185° C with superheated steam and then finished off by rinsing and soaping as described in Example 5.

A fast turquoise print on a white ground is obtained.

The dyes set out in the following Tables are obtained analogously to Examples 1 to 4. On polyester or cotton fibers and also on union fabric of the two types of fibers they exhibit similar tinctorial properties to the dyes set out in Examples 1 to 10.

Table 1

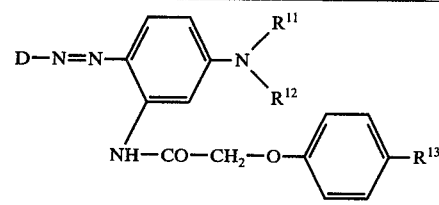

| No. | D—NH$_2$ | R$^{11}$ | R$^{12}$ | R$^{13}$ | Hue on polyester/cotton |
|---|---|---|---|---|---|
| 11 | 3-amino-5-nitro-7-bromo-2,1-benzo-isothiazole | C$_2$H$_5$ | C$_2$H$_5$ | H | bluish green |
| 12 | 4-amino-5-cyano-7-nitro-1,2-benzo-isothiazole | C$_2$H$_5$ | C$_2$H$_5$ | H | blue |
| 13 | 4-amino-7-nitro-1,2-benzoiso-thiazole | C$_2$H$_5$ | C$_2$H$_5$ | H | bluish violet |
| 14 | 4-amino-7-nitro-1,2-benzoiso-thiazole | C$_2$H$_4$CN | C$_2$H$_4$CN | CH$_3$ | ruby |
| 15 | 2-phenyl-5-amino-1,3,4-thiadiazole | C$_2$H$_5$ | C$_2$H$_5$ | H | ruby |
| 16 | 3-methylmercapto-5-amino-1,2,4-thiadiazole | C$_2$H$_5$ | C$_2$H$_5$ | H | red |
| 17 | 3-β-carbomethoxy-ethylmercapto-5-amino-1,2,4-thia-diazole | C$_2$H$_4$OCH$_3$ | C$_2$H$_4$CN | Cl | red |
| 18 | 3-β-carbomethoxy-ethylmercapto-5-amino-1,2,4-thia-diazole | C$_2$H$_5$ | C$_2$H$_5$ | H | reddish violet |
| 19 | 3-aminophthalic acid-p-tolylimide | C$_2$H$_5$ | C$_2$H$_5$ | H | red |
| 20 | 4-aminophthalic acid phenylimide | C$_2$H$_4$CN | C$_2$H$_5$ | H | red |
| 21 | 4-aminophthalic acid-3'-methoxy-propylimide | C$_2$H$_5$ | C$_2$H$_5$ | H | red |
| 22 | 1-aminoanthra-quinone | C$_2$H$_5$ | C$_2$H$_5$ | H | brown |
| 23 | 2-aminodiphenyl-sulfone | C$_2$H$_5$ | C$_2$H$_5$ | H | orange |
| 24 | 2-aminobenzo-phenone | C$_2$H$_4$CN | C$_2$H$_5$ | CH$_3$ | orange |
| 25 | 1-aminobenzene-4-methylsulfone | C$_2$H$_5$ | C$_2$H$_5$ | H | orange |
| 26 | 4-aminonaphthalic acid-2'-ethyl-hexylimide | C$_2$H$_5$ | C$_2$H$_5$ | H | reddish violet |
| 27 | 4-aminonaphthalic acid-n-butylimide | C$_2$H$_4$OCH$_3$ | C$_2$H$_5$ | Cl | reddish violet |
| 28 | 4-amino-3-bromo-naphthalic acid n-butylimide | C$_2$H$_5$ | C$_2$H$_5$ | H | reddish violet |
| 29 | 2,4,5-trichloro-aniline | C$_2$H$_4$CN | C$_2$H$_4$OCOCH$_3$ | H | golden yellow |
| 30 | 2,4,5-trichloro-aniline | C$_2$H$_5$ | C$_2$H$_5$ | H | orange |
| 31 | 2-amino-5-nitro-thiazole | C$_2$H$_5$ | C$_2$H$_5$ | H | violet |
| 32 | 2-brom-6-cyano-4-nitroaniline | C$_2$H$_5$ | C$_2$H$_5$ | H | bluish violet |
| 33 | 2,4-dinitro-6-bromoaniline | C$_2$H$_5$ | C$_2$H$_5$ | H | violet |
| 34 | 2-(2-methyl-1,3,4- | C$_2$H$_4$CN | C$_2$H$_5$ | H | reddish |

Table 1-continued

[Structure: D—N=N—phenyl with NR11R12 group and NH—CO—CH2—O—phenyl—R13 substituent]

| No. | D—NH₂ | R¹¹ | R¹² | R¹³ | Hue on polyester/cotton |
|---|---|---|---|---|---|
|  | thiadiazolyl)-4-nitro-6-bromoaniline |  |  |  | violet |
| 35 | 2-(2-methyl-1,3,4-thiadiazolyl)-4-nitroaniline | $C_2H_5$ | $C_2H_5$ | H | reddish violet |
| 36 | 3-chloro-4-amino-azobenzene | $C_2H_5$ | $C_2H_5$ | H | reddish violet |
| 37 | 3-bromo-4-amino-azobenzene | $C_2H_4CN$ | $C_2H_4OCOCH_3$ | H | red |
| 38 | 2-methyl-4',5-di-methoxy-4-amino-azobenzene | $C_2H_5$ | $C_2H_5$ | H | red |
| 39 | 3',2-dimethyl-4-aminoazobenzene | $C_2H_5$ | $C_2H_5$ | H | ruby |
| 40 | 2-(benzothiazolyl-2)-aniline | $C_2H_5$ | $C_2H_5$ | H | orange |
| 41 | 2-(benzoxazolyl-2)-4-nitroaniline | $C_2H_5$ | $C_2H_5$ | H | ruby |
| 42 | 2-(2-phenyl-1,3,4-oxadiazolyl)-4,6-dichloroaniline | $C_2H_5$ | $C_2H_5$ | H | red |
| 43 | 4-aminobenzene-sulfonic acid-N-methylanilide | $C_2H_5$ | $C_2H_5$ | H | golden yellow |
| 44 | 4-aminobenzoic acid benzyl ester | $C_2H_5$ | $C_2H_5$ | H | golden yellow |
| 45 | 2-bromo-4-nitro-6-(3-o-tolyl-1,2,4-oxadiazolyl)-aniline | $C_2H_4O\overset{O}{\overset{\|}{C}}CH_3$ | $C_2H_5$ | H | violet |
| 46 | 2,6-dichloro-4-nitroaniline | $C_2H_5$ | $C_2H_5$ | H | reddish brown |

Table 2

[Structure: D—N=N—phenyl with R, X substituents and N(R²)(C₂H₄O—CO—CH₂—O—phenyl) group]

| No. | D-NH₂ | R | R² | X | Hue on polyester cotton |
|---|---|---|---|---|---|
| 47 | 4-aminobenzene-sulfonic acid anilide | H | $C_2H_4CN$ | H | golden yellow |
| 48 | 4-aminobenzoic acid phenyl ester | H | $C_2H_5$ | $NHCOCH_3$ | orange |
| 49 | 2,6-dibromo-4-nitroaniline | H | $C_2H_4CN$ | H | brown |
| 50 | 3-β-cyanoethyl-mercapto-5-amino-1,2,4-thiadiazole | $OCH_3$ | $C_2H_4CN$ | $NHCOCH_3$ | red |
| 51 | 2-phenyl-5-amino-1,3,4-thiadiazole | H | $C_2H_5$ | H | red |
| 52 | 4-amino-7-nitro-1,2-benzoisothiazole | H | $C_2H_4CN$ | $CH_3$ | ruby |
| 53 | 4-amino-5-bromo-7-nitro-1,2-benzo-isothiazole | H | $-O_2CCH_2OC_6H_5$ | $NHCOCH_3$ | violet |
| 54 | 4-amino-5-bromo-7-nitro-1,2-benzo-isothiazole | H | $C_2H_5$ | H | violet |
| 55 | 3-amino-5-nitro-2,1-benzoiso-thiazole | H | $C_2H_4CN$ | $NHCOCH_3$ | bluish violet |
| 56 | 4-aminophthalic acid phenylimide | H | $C_2H_5$ | $CH_3$ | red |

Table 2-continued

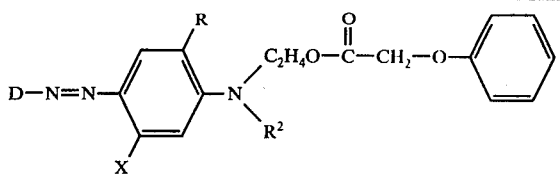

| No. | D-NH$_2$ | R | R$^2$ | X | Hue on polyester cotton |
|---|---|---|---|---|---|
| 57 | 4-aminonaphthalic acid n-butylimide | H | C$_2$H$_4$CN | H | ruby |
| 58 | 4-amino-3-bromo-naphthalic acid methylimide | H | —O$_2$CCH$_2$OC$_6$H$_5$ | NHCOC$_2$H$_5$ | violet |
| 59 | 2-aminodiphenyl-sulfone | H | C$_2$H$_4$CN | NHCOCH$_3$ | orange |
| 60 | 4-diphenylphos-phinyl-aniline | OCH$_3$ | —O$_2$CCH$_2$OC$_6$H$_5$ | NHCOCH$_3$ | scarlet |
| 61 | 4-aminoazobenzene | H | C$_2$H$_4$CN | H | scarlet |
| 62 | 3,5-dibromo-4-aminoazobenzene | H | C$_2$H$_5$ | CH$_3$ | reddish brown |
| 63 | 2',3-chloro-4-aminoazobenzene | H | C$_2$H$_4$OH | NHCOCH$_3$ | ruby |
| 64 | 2-(2-phenyl-1,3,4-oxadiazolyl)-4-nitroaniline | H | C$_2$H$_4$CN | H | red |
| 65 | 2-(4-methyl-1,3-thiazolyl-2)-4-nitroaniline | H | C$_2$H$_5$ | CH$_3$ | ruby |
| 66 | 2-(2-n-pentyl-1,3,4-thiadiazolyl)-4-nitroaniline | H | C$_2$H$_4$CN | H | red |
| 67 | 1-amino-4-chloro-anthraquinone | H | C$_2$H$_4$OH | NHCOCH$_3$ | brownish violet |

Table 3

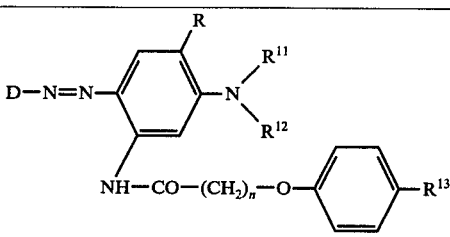

| No. | D-NH$_2$ | R | R$^{11}$ | R$^{12}$ | R$^{13}$ | n | Hue on polyester/cotton |
|---|---|---|---|---|---|---|---|
| 68 | 4-amino-7-nitro-1,2-benzoisothiazole | H | CH$_2$—CH=CH$_2$ | CH$_2$—CH=CH$_2$ | H | 1 | bluish violet |
| 69 | " | OCH$_3$ | C$_2$H$_5$ | C$_2$H$_5$ | H | 1 | blue |
| 70 | " | OC$_2$H$_5$ | " | " | H | 1 | blue |
| 71 | 4-amino-5-bromo-7-nitro-1,2-benzo-isothiazole | H | C$_2$H$_5$ | C$_2$H$_5$ | H | 2 | navy blue |
| 72 | " | H | " | " | H | 3 | navy blue |
| 73 | " | H | " | " | OCH$_3$ | 1 | navy blue |
| 74 | " | H | " | " | Br | 1 | navy blue |
| 75 | 3-chloro-4-amino-azobenzene | H | CH$_2$—CH=CH$_2$ | CH$_2$—CH=CH$_2$ | H | 1 | reddish violet |
| 76 | " | OCH$_3$ | C$_2$H$_4$CN | CH$_2$—CH=CH$_2$ | H | 1 | reddish violet |
| 77 | 2-(benzooxazolyl-2')-aniline | H | CH$_2$—CH=CH$_2$ | CH$_2$—CH=CH$_2$ | H | 1 | orange |
| 78 | 2-(benzothiazolyl-2')-aniline | H | " | " | H | 1 | orange |
| 79 | 2-amino-6-nitro-benzothiazole | H | C$_2$H$_5$ | C$_2$H$_5$ | H | 1 | reddish violet |
| 80 | 1-amino-2-(3-phenyl-1,2,4-oxadiazolyl-5)-benzene | H | " | " | H | 1 | orange |
| 81 | 1-amino-2-bromo-4-nitro-6-(4-methyl-5-butoxycarbonyl-thiazolyl-2)-benzene | H | " | " | H | 1 | bluish violet |
| 82 | 1-amino-2-(4-methyl-thiazolyl-2)-benzene | H | " | " | H | 1 | orange |
| 83 | 1-amino-4-methyl-3-(N-ethyl-N-phenyl-sulfonamido)-benzene | H | " | " | H | 1 | orange |
| 84 | 1-amino-4-chloro-2- | H | C$_2$H$_5$ | C$_2$H$_5$ | H | 1 | orange |

Table 3-continued

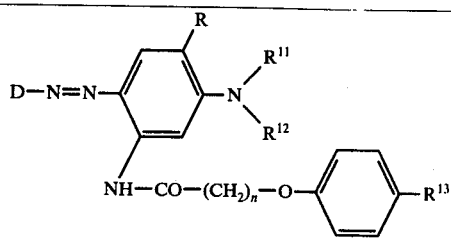

| No. | D-NH₂ | R | R¹¹ | R¹² | R¹³ | n | Hue on polyester/cotton |
|---|---|---|---|---|---|---|---|
| | trifluoromethyl-benzene | | | | | | |
| 85 | 1-amino-2-chloro-benzene-4-methyl-sulfone | H | " | " | H | 1 | scarlet |
| 86 | 1-amino-4-(phenoxy-ethoxypropylamino-carbonyl)-benzene | H | " | " | H | 1 | orange |
| 87 | 1-amino-4-(phenoxy-ethoxy-propylamino-sulfonyl)-benzene | H | CH₂—CH=CH₂ | CH₂—CH=CH₂ | H | 1 | orange |

Table 4

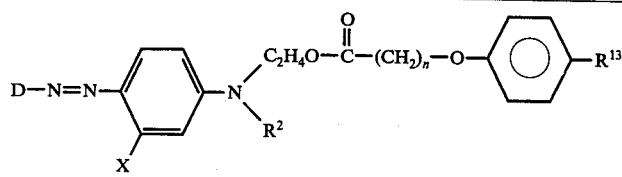

| No. | D | R² | X | n | R¹³ | Hue on polyester/cotton |
|---|---|---|---|---|---|---|
| 88 | 2-phenyl-5-amino-1,3,4-thiadiazole | CH₂—CH=CH₂ | H | 1 | H | red |
| 89 | 1-amino-2-(3-phenyl-1,2,4-oxadiazolyl-5)benzene | C₂H₄CN | Cl | 1 | H | orange |
| 90 | 4-amino-7-nitro-1,2-benzoisothiazole | C₂H₄CN | NHCOC₄H₉ | 1 | H | violet |
| 91 | " | " | NHCOCH₂Cl | 1 | H | violet |
| 92 | " | " | NHCOC₆H₅ | 1 | CH₃ | violet |
| 93 | 4-amino-5-bromo-7-nitro-1,2-benzoisothiazole | CH₂—CH=CH₂ | NHSO₂C₆H₅ | 1 | H | bluish violet |
| 94 | " | " | NHSO₂CH₃ | 1 | H | bluish violet |
| 95 | " | C₂H₄CN | NHCOCH₃ | 2 | H | violet |
| 96 | 1-amino-4-(phenoxy-propylamino-sulfonyl)-benzene | C₂H₄OCOCH₂OC₆H₅ | CH₃ | 1 | H | orange |
| 97 | 3-(benzooxazolyl-2)aniline | " | H | 1 | H | orange |

EXAMPLE 98

60.5 parts of the dye of the formula:

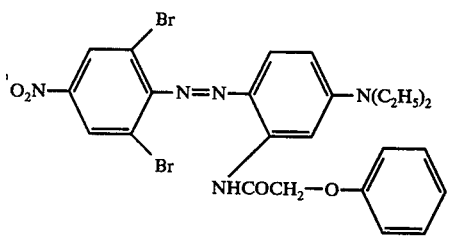

is stirred in 500 parts of N,N-dimethylformamide with 28 parts of cuprous cyanide (70%) for 8 hours at 65° C. 400 parts of methanol is added at ambient temperature and the dye is then filtered off, washed with methanol, 10% aqueous ammonia solution and water and dried at 50° C at subatmospheric pressure. The dye of the formula:

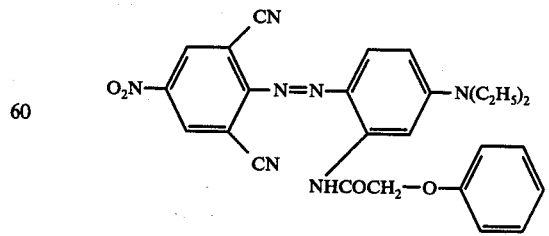

is obtained as a bluish black powder. When the dye is applied to cotton cloth, polyester cloth or cotton/-polyester union fabric analogously to Examples 5 to 10, bluish violet prints or dyeings are obtained having good fastness properties.

The same dye is obtained by the reaction of a dye of the formula:

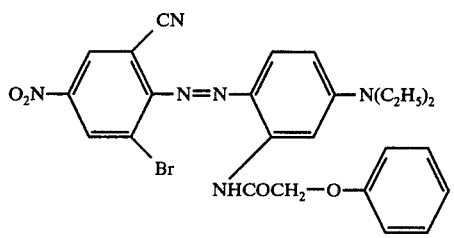

with an agent forming cuprous cyanide or by diazotization of 2,6-dicyano-4-nitroaniline and coupling with N,N-dimethyl-N'-phenoxyacetyl-1,3-phenylenediamine as described in Example 2.

The following dyes having similar tinctorial properties are prepared in the same manner:

thereof and, while the fibers are still swollen, with an essentially water-insoluble dye of the formula

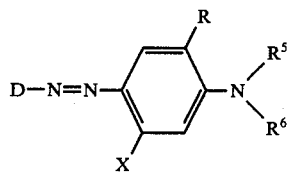

in which
D is phenyl substituted by fluoro, chloro, bromo, nitro, cyano, trifluoromethyl, methylsulfonyl, ethylsulfonyl, phenylsulfonyl,
$C_1$ to $C_8$ alkoxycarbonyl, phenoxycarbonyl, benzyloxycarbonyl, phenoxyethoxycarbonyl, $C_1$ to $C_4$ alkoxyethoxycarbonyl, methyl, ethyl, methoxy, ethoxy, phenoxy, carboxy, phenylazo, phenylazo bearing fluoro, chloro, bromo, nitro, cyano, trifluoromethyl, methyl, ethyl, methoxy, ethoxy,

| Example No. | | Hue on polyester/cotton |
|---|---|---|
| 99 | 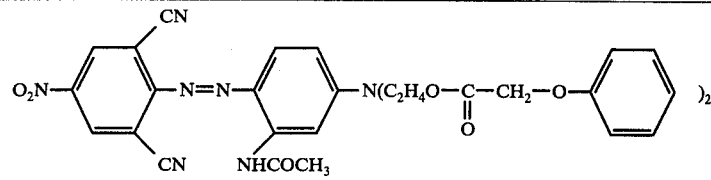 | violet |
| 100 | 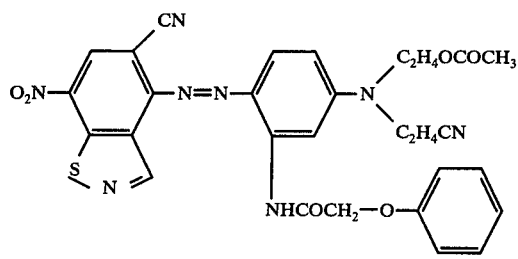 | bluish violet |
| 101 | 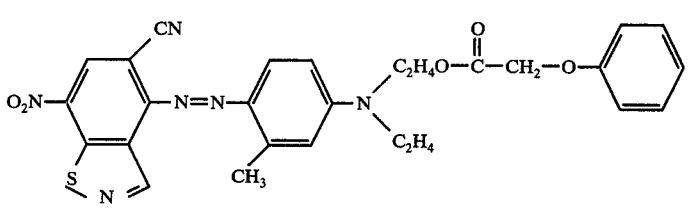 | violet |
| 102 | 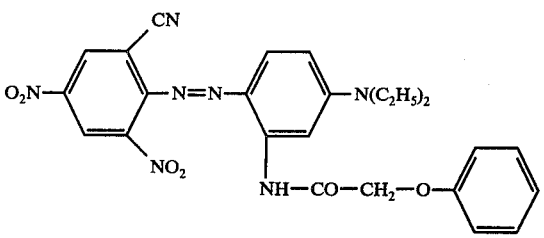 | reddish blue |

We claim:
1. Uniformly dyed water-swellable cellulosic fibers, said fibers being fast to washing, dry cleaning, sublimation and light and having been produced by contacting water-swellable cellulose fibers sequentially or concomitantly with water, ethylene glycol or a derivative

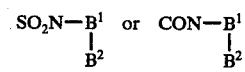

as a substituent,

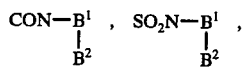

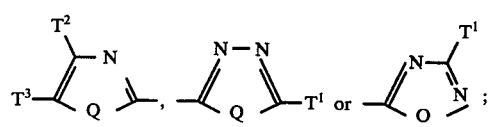

benzothiazolyl bearing nitro, thiocyanato, methylsulfonyl or methoxy as a substituent; benzoisothioazolyl bearing chloro, bromo, nitro or cyano as a substituent; thioazolyl bearing phenyl or nitro as a substituent or thiodiazolyl bearing phenyl, methylmercapto, ethylmercapto, cyanoethylmercapto or $C_1$ to $C_4$ alkoxycarbonylethylmercapto as a substituent;

Q is O or S;

R is hydrogen, methyl, methoxy or ethoxy;

X is hydrogen, chloro, methyl, $C_2$ to $C_4$ alkanoylamino, chloroacetylamino, trifluoroacetylamino, benzoylamino, methylsulfonylamino, phenylsulfonylamino or NHCOR$^3$—O—Ar;

$R^5$ is $C_1$ to $C_4$ alkyl, allyl, β-hydroxyethyl, β-cyanoethyl, β-acetoxyethyl, β-methoxyethyl, β-ethoxyethyl, cyclohexyl, benzyl, β-phenylethyl or $C_2H_4OCOR^3$—OAr;

$R^6$ is $C_1$ to $C_4$ alkyl, allyl, acetoxyethyl, β-cyanoethyl, benzyl or $C_2H_4OCOR^3OAr$;

$B^1$ is hydrogen, $C_1$ to $C_8$ alkyl, cyclohexyl, β-hydroxyethyl, benzyl, phenylethyl or phenyl optionally bearing chloro, methyl or methoxy as a substituent;

$B^2$ is hydrogen, $C_1$ to $C_4$ alkyl or β-hydroxyethyl;

is pyrrolidyl, piperidyl, morpholyl or $NH(CH_2)_3OC_2H_4OB^3$;

$B^3$ is $C_1$ to $C_4$ alkyl, cyclohexyl, phenyl or tolyl;

$T^1$ is $C_1$ to $C_8$ alkyl, methoxymethyl, phenoxymethyl, phenyl or phenyl bearing chloro, bromo, nitro, methoxy or ethoxy as a substituent;

$T^2$ is hydrogen or methyl;

$T^3$ is methyl, ethyl, phenyl or phenyl bearing chloro, bromo, or methyl as a substituent;

$T^2$ and $T^3$ together are a fused benzene ring optionally bearing methoxy, ethoxy, methyl or chloro as a substituent;

$R^3$ is $C_1$ to $C_3$ alkylene; and

Ar is phenyl or phenyl bearing chloro, bromo, methyl or methoxy as a substituent and at least one of the radicals $R^5$, $R^6$ or X contains a group of the formula OCOR$^3$—OAr.

2. The fibers according to claim 1 with the dye of the formula

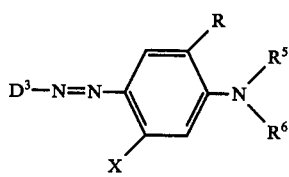

in which $D^3$ is phenyl substituted once by

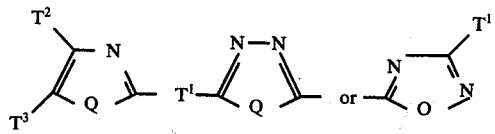

and optionally further substituted by chloro, bromo, nitro or cyano, or is benzoisothyiazolyl substituted by chloro, bromo, nitro or cyano, R, $R^5$, $R^6$, Q, $T^1$, $T^2$, $T^3$ and X have the meanings given in claim 1, at least one of $R^5$, $R^6$ and X containing the group OCO—$R^3$—O—Ar, $R^3$ and Ar having the meanings given in claim 1.

3. The fibers according to claim 1, wherein D is phenyl substituted by phenylazo, chlorophenylazo, methylphenylazo,

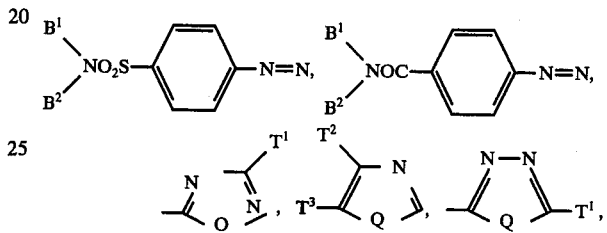

chloro or bromo;

or benzoisothiazolyl substituted by chloro, bromo, nitro or cyano.

4. The fibers according to claim 1, wherein D is benzoisothiazolyl substituted by chloro, bromo, nitro or cyano.

5. The fibers according to claim 1, wherein Q is oxygen.

6. The fibers according to claim 1, wherein R is hydrogen.

7. The fibers according to claim 1, wherein X is NHCOR$^3$OAr.

8. The fibers according to claim 1, wherein X is NHCOCH$_2$OC$_6$H$_5$.

9. The fibers according to claim 1, wherein $R^5$ and $R^6$ are $C_1$ to $C_4$ alkyl, β-cyanoethyl or $C_2H_4OCOR^3OAr$.

10. The fibers according to claim 1, wherein

is NH(CH$_2$)$_3$OC$_2$H$_4$OB$^3$.

11. The fibers according to claim 1, wherein $T^1$ is $C_1$ to $C_8$ alkyl or phenyl.

12. The fibers according to claim 1, wherein $R^3$ is —CH$_2$—.

13. The fibers according to claim 1, wherein
D is benzoisothiazolyl substituted by chloro, bromo, nitro or cyano,
R is hydrogen,
X is NHCOCH$_2$OC$_6$H$_5$,
$R^5$ is $C_1$ to $C_4$ alkyl, β-cyanoethyl or $C_2H_4OCOC_6H_5$ and
$R^6$ is $C_1$ to $C_4$ alkyl.

14. The fibers according to claim 1 with the dye of the formula,

15. The fibers according to claim 1 with the dye of the formula,
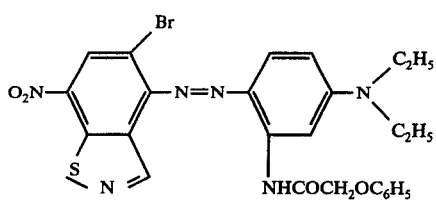
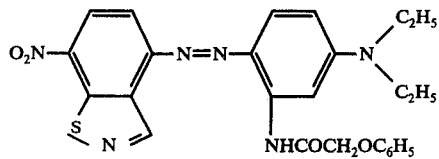
16. The fibers according to claim 1, wherein the fibers are cotton fibers.
17. The fibers according to claim 1, admixed or blended with synthetic fibers.
18. The fibers of claim 17, wherein the synthetic fibers are polyester fibers.
* * * * *

UNITED STATES PATENT AND TRADEMARK OFFICE
CERTIFICATE OF CORRECTION

PATENT NO. : 4,083,684
DATED : April 11, 1978
INVENTOR(S) : HANSEN et al

It is certified that error appears in the above-identified patent and that said Letters Patent are hereby corrected as shown below:

IN THE ABSTRACT: $-\underset{|}{\overset{R^4}{N}}-$ should appear after "sulfur or" in line 14; Column 20, next to last line and Column 21, line 1, "$SO_2-\underset{|}{\overset{}{N}}$" and "$CON-\underset{|}{\overset{}{B^1}}$" respectively should be
$B^2$ and $B^2$ -- --$SO_2\underset{|}{\overset{}{N}}-B^1$ -- and -- $CON-B^1$ -- .
$B^2$ and $B^2$

Signed and Sealed this

*Nineteenth* Day of *December 1978*

[SEAL]

Attest:

RUTH C. MASON
*Attesting Officer*

DONALD W. BANNER
*Commissioner of Patents and Trademarks*